United States Patent [19]

Ohlhaber et al.

[11] Patent Number: 4,695,127
[45] Date of Patent: Sep. 22, 1987

[54] HYBRID COAXIAL-OPTICAL CABLE AND METHOD OF USE

[75] Inventors: Ronald L. Ohlhaber; Thaddeus R. Ulijasz, both of Geneva, Ill.

[73] Assignee: Cooper Industries, Inc., Houston, Tex.

[21] Appl. No.: 716,579

[22] Filed: Mar. 27, 1985

[51] Int. Cl.⁴ .............................................. G02B 6/44
[52] U.S. Cl. .................. 350/96.23; 174/70 R
[58] Field of Search ............... 350/96.23; 174/70 R

[56] References Cited

U.S. PATENT DOCUMENTS

| | | | |
|---|---|---|---|
| 2,348,752 | 5/1944 | Quayle | 174/29 |
| 3,883,218 | 5/1975 | Slaughter | 350/96 B |
| 4,089,585 | 5/1978 | Slaughter et al. | 350/96.23 |
| 4,118,594 | 10/1978 | Arnaud | 350/96.23 |
| 4,141,623 | 2/1979 | Dubost et al. | 350/96.23 |
| 4,156,104 | 5/1979 | Mondello | 174/70 R |
| 4,158,478 | 6/1979 | D'Auria et al. | 350/96.23 |
| 4,306,923 | 12/1981 | MacPherson | 156/51 |
| 4,416,508 | 11/1983 | Dey et al. | 350/96.23 |
| 4,437,729 | 3/1984 | Parfree et al. | 350/96.23 |

FOREIGN PATENT DOCUMENTS

| | | | |
|---|---|---|---|
| 0006364 | 1/1980 | European Pat. Off. | 350/96.23 |
| 2728658 | 1/1979 | Fed. Rep. of Germany | 350/96.23 |
| 2835241 | 2/1980 | Fed. Rep. of Germany | 350/96.23 |
| 59-48706 | 3/1984 | Japan | 350/96.23 |
| 1592192 | 7/1981 | United Kingdom | 350/96.23 |

*Primary Examiner*—John Lee
*Attorney, Agent, or Firm*—Fitch, Even, Tabin & Flannery

[57] ABSTRACT

A hybrid cable of substantially uniform cross-section for concurrently carrying an electrical signal and an optical signal. The cable includes a metallic conductor disposed at the center of the cable for carrying the electrical signal. The cable also includes a resilient buffer tube and an optical conductor for carrying the optical signal positioned inside the tube and having an outside diameter smaller than the inside diameter of the tube so that the optical conductor is movable inside the tube. A metallic shield surrounds the metallic conductor and the tube. The metallic conductor and the shield are coaxial. The cable also includes an electrically insulative resilient outer jacket so that the cable gives the appearance of and taps as a conventional coaxial cable but additionally can transmit an optical signal. A method of using the hybrid cable is also disclosed.

15 Claims, 6 Drawing Figures

HYBRID COAXIAL-OPTICAL CABLE AND METHOD OF USE

The present invention relates to electrical cables and, more specifically, to a hybrid coaxial cable having one or more optical conductors for use in secure data transmission.

BACKGROUND OF THE INVENTION

It is often desirable to transmit confidential information using a cable. Various methods exist for accomplishing this but they are relatively expensive and/or tend to call attention to themselves. For example, the cable used for carrying the confidential information might be run inside conduit. However, when other cables not carrying such information are run in parallel with the conduit and are not themselves run through the expensive conduit, a party desiring to intercept the confidential information has his attention drawn to the carrier of the confidential information. Alternatively, the information could be transmitted in coded form. This requires the use of expensive encoders and decoders.

Various hybrid cables including a central metallic conductor or strength member and one or more optical conductors have been proposed. U.S. Pat. No. 4,141,623 shows a submarine cable for long distance signal transmission. The cable has a number of rings about the central conductor each formed by optical conductors positioned in buffer tubes. This cable has a relatively thick aluminum sheath pressed or swaged about the assembled inner elements. A similar submarine cable for optical communications is shown in U.S. Pat. No. 4,156,104.

Another hybrid coaxial optical fiber cable is disclosed in U.S. Pat. No. 4,158,478, and includes a solid dielectric ring in which regularly spaced optical fibers are embedded in a circular array. The ring encompasses the central metallic conductor while a conducting screen is positioned about the ring.

The submarine cables, with their large size and thick aluminum jackets, are inappropriate for use in a relatively short run transmission of confidential information. They do not appear as standard coaxial cable and cannot be easily bent. The other hybrid cable is usable for only limited bending and within a limited temperature range because the optical fibers are embedded in the plastic ring. The thermal coefficient of expansion of plastic is many times higher than that of glass. Thus if their cable were sharply bent and used over a broad temperature range, a large drop in temperature would cause the plastic to shrink, effecting more severe bending of the glass fibers with consequent light attenuation and possible fiber breakage. Additionally the presence of the large plastic ring between the central metallic conductor and the screen results in the cable exhibiting an undesirable high capacitance because the dielectric constant of plastic is much greater than that of air.

SUMMARY OF THE INVENTION

Among the several aspects of the present invention may be noted the provision of an improved hybrid cable including both electrical and optical conductors. The cable provides the outward appearance of a conventional coaxial cable, and functions and taps like one. The cable however includes at least one optical conductor which may be employed to carry confidential information. The cable does not draw attention to itself and, while the electrical conductor may be easily tapped, tapping of the optical conductor is difficult because that conductor is easily movable within the cabe so that it would be deflected upon being contacted by a probe. The improved cable is also flexible, rugged and reliable in use, has long service life, and is simple and economical to manufacture. Other aspects and features will be, in part, apparent and, in part, pointed out hereinafter in the following specification and in the accompanying claims and drawings.

Briefly, the hybrid cable of the present invention includes a metallic conductor held at the center of the cable for carrying an electrical signal, a resilient buffer tube, and an optical conductor for carrying the optical signal positioned inside the tube. The optical conductor has an outside diameter smaller the the inside diameter of the tube so that the optical conductor is movable inside the tube. A metallic braid surrounds the metallic conductor and the tube and is coaxial with the metallic conductor. The cable also includes an electrically insulative resilient outer jacket.

As a method of using the hybrid cable, the present invention includes the following steps:

a. An optical signal is applied to the optical conductor with the optical signal carrying confidential information.

b. An electrical signal which does not carry confidential information is applied to the metallic conductor so that tapping of the hybrid cable as a conventional coaxial cable yields only the non-confidential electrical signal.

BRIEF DESCRIPTION OF THE DRAWINGS

Corresponding reference characters indicate corresponding components throughout the several views of the drawings.

DESCRIPTION OF THE PREFERRED EMBODIMENTS

Figure 1:
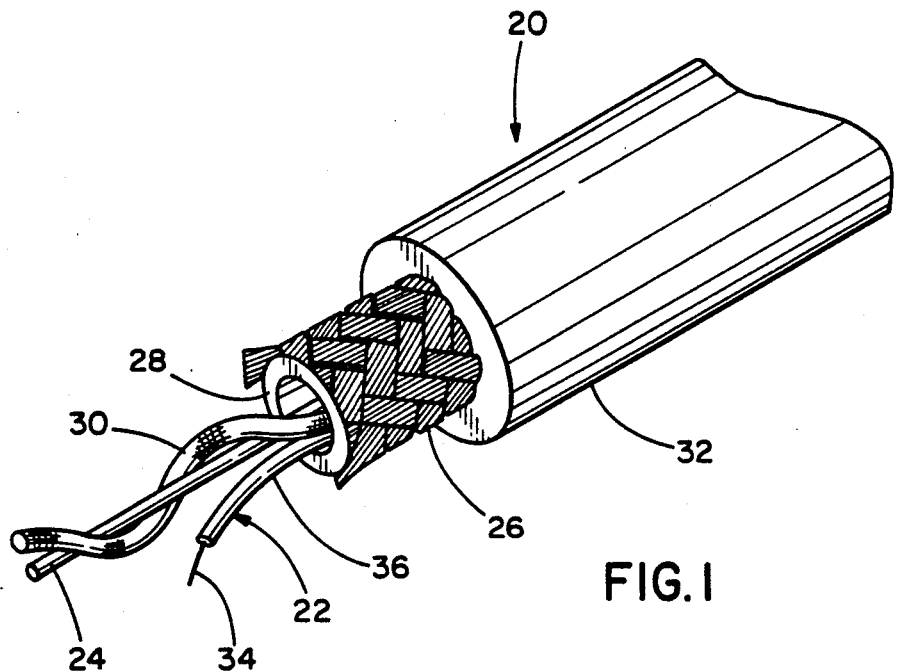
FIG. 1 illustrates, in an enlarged scale, a length of one preferred embodiment of the hybrid cable of the present invention with components of the cable removed to reveal underlying layers and elements.
Figure 2:
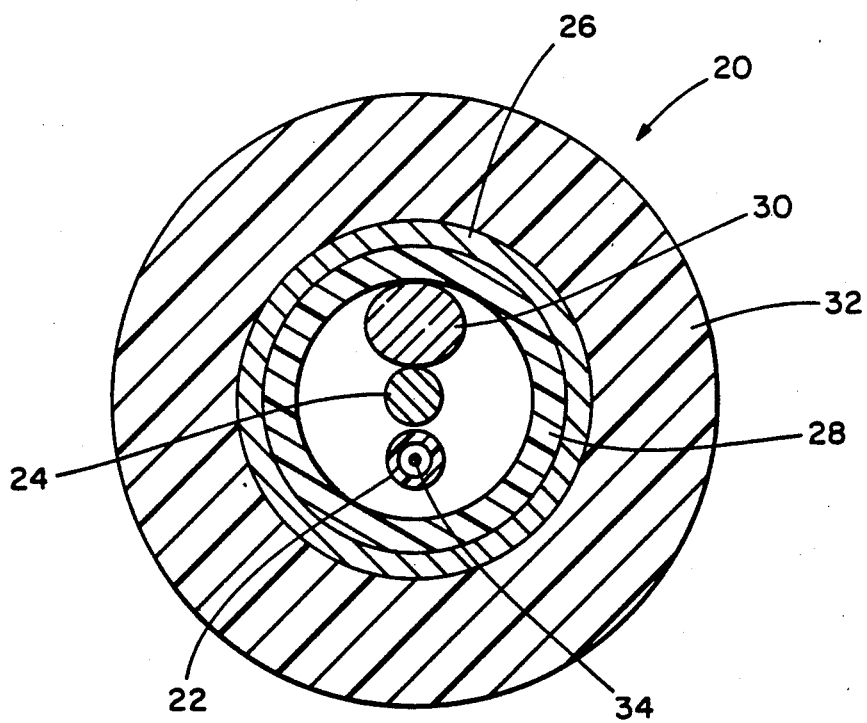
FIG. 2 is a transverse cross-sectional view of the cable of FIG. 1.
Figure 6:
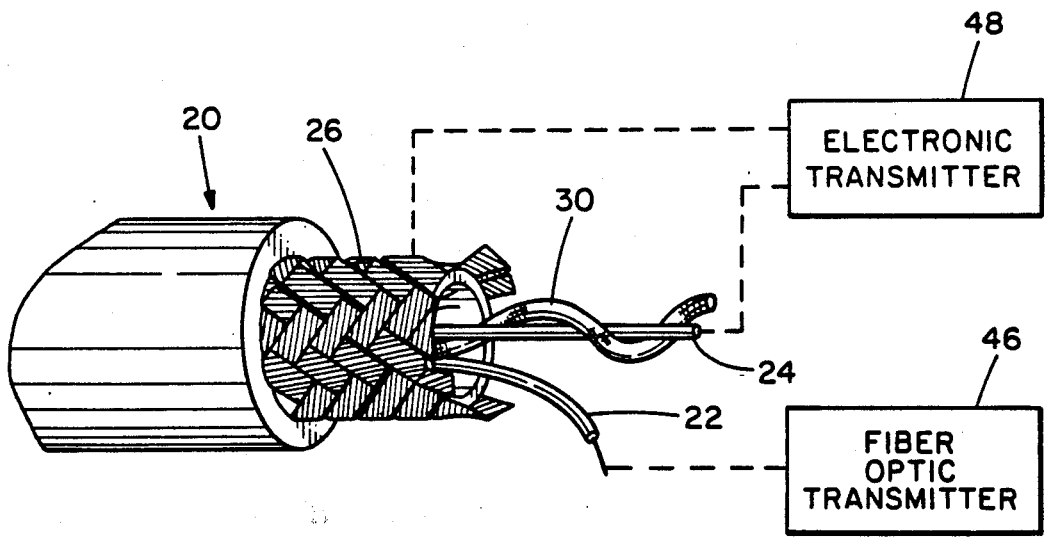
FIG. 6, shown partially in the form of a block diagram, illustrates the cable of FIG. 1 being used for a secure data transmission.

Referring now to the drawings, one preferred embodiment of a hybrid cable of the present invention for concurrently carrying an electrical signal and one or more optical signals, is generally indicated in FIGS. 1, 2 and 6 by reference character 20. The cable 20 is particularly useful for transmitting confidential information using an optical conductor 22 which is movable within the cable. The cable also includes a metallic conductor 24 held at the center of the cable, and a metallic braid 26 coaxial therewith. The cable looks like a conventional coaxial cable, and transmits an electrical signal and can be tapped like a conventional coaxial cable. The appearance of a conventional coaxial cable offers some security because one attempting to intercept the confidential signal could not easily identify the cable 20 when it is run in parallel with a number of conventional coaxial cables. Even when run alone, the use of the cable 20 can defeat or frustrate an attempted interception because the metallic central conductor 24, on which a nonconfidential or decoy signal can be transmitted, can be easily tapped using, for example, a probe. Even if the decoy is recognized, it is difficult to intercept the confidential signal carried by the optical conductor 22, without destroying the cable, because as the optical conductor 22 is movable inside the cable, it will deflect upon being contacted by the probe.

More specifically, the hybrid cable 20 includes a buffer tube 28 of a somewhat rigid but resilient thermoplastic material. The central metallic conductor 24, which is preferably formed of copper, is held centered in the tube by means of a length of dielectric spacer 30 wound around the conductor 24 and concurrently engaging it and the inside surface of the buffer tube 28. Adjacent turns of the spacer 30 are sufficiently spaced so that the optical conductor 22, which has an outside diameter much smaller than the inside diameter of the buffer tube, can also make a loose winding around the metallic conductor with sufficient air space left to enable the optical conductor 22 to be movable inside the cable. The metallic braid 26 is positioned surrounding the buffer to be in a spaced, coaxial arrangement with central conductor 24. The cable also includes a protective outer jacket 32 preferably formed of a tough, abrasion resistant thermoplastic material.

The optical conductor 22 may be of the type comprising a commercially available glass fiber assembly core 34 and a protective resilient sleeve 36 formed of, preferably, a thermoplastic rubber material. The fiber assembly has a glass fiber center for transmitting light, a glass cladding for reflecting light back into the glass fiber center, and an ultraviolet cured acrylate sleeve, applied at the time of manufacture of the glass and cladding, for mechanical protection of the glass.

Figure 3:
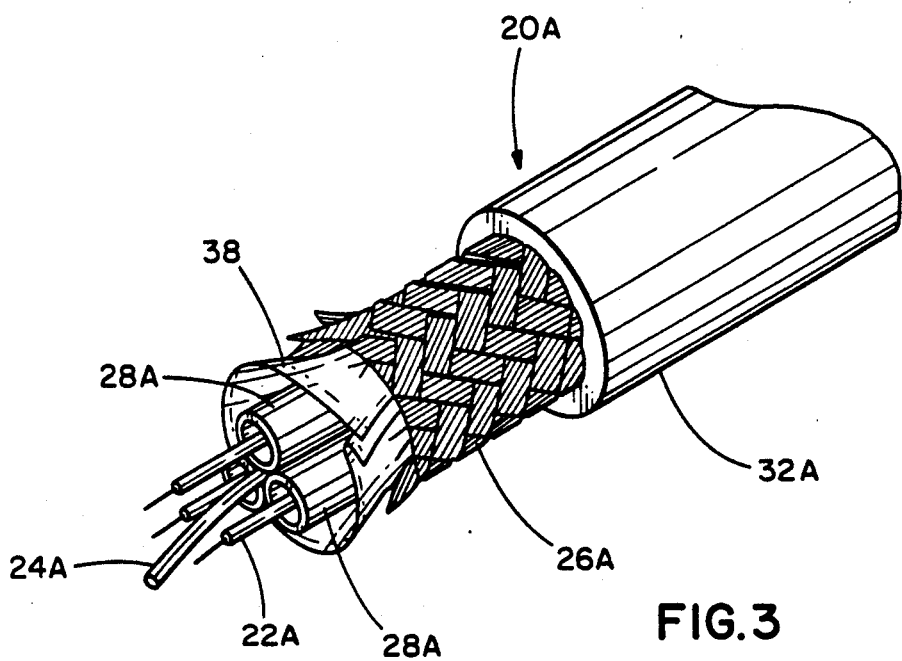
FIG. 3, similar to FIG. 1, shows an alternate preferred embodiment of the hybrid cable of the present invention.
Figure 4:
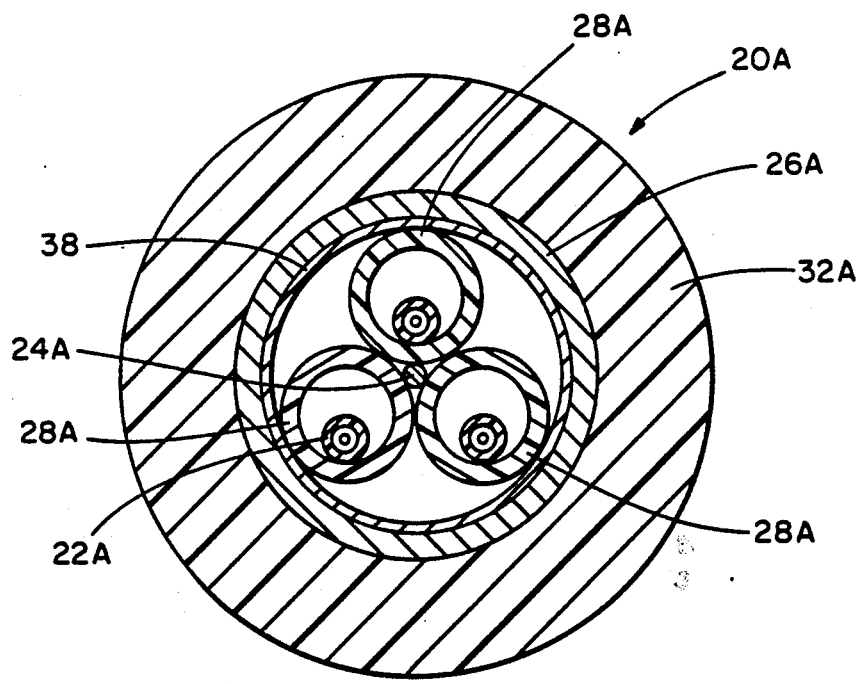
FIG. 4 is a transverse cross-sectional view of the cable of FIG. 3.

An alternate preferred embodiment of the hybrid cable of the present invention is generally indicated at reference character 20A in FIGS. 3 and 4. Components of the cable 20A generally corresponding to components of the cable 20 are indicated by the reference numeral assigned to the component of cable 20 with the addition of the suffix "A". The cable 20A includes a plurality of buffer tubes 28A, for example, three, with an optical conductor 22A disposed in each tube. The three buffer tubes constitute centering means for the central metallic conductor 24A because each tube 28A concurrently engages conductor 24A and the other two buffer tubes firmly to hold the conductor 24A centrally located in the cable. Although a single ring of three buffer tubes is shown, additional tubes and additional rings of tubes may be used, depending on the requirements of a particular application.

The metallic braid 26A is positioned surrounding the buffer tubes 28A. Optionally a layer of metallic foil 38 is disposed under the braid and in contact therewith. The use of the braid over the foil results in the lowest radio frequency leakage and lowest susceptibility to electrical noise. The braid functions to limit penetration of low frequency noise while the presence of the foil limits high frequency noise penetration.

The cables 20 and 20A are usable even when relatively severe bending is required and can be used over a large temperature range. It is noted that the optical conductors 22 and 22A are movable within their plastic buffer tubes. As the thermal coefficient of expansion of plastic is much higher than that of glass, a large drop in temperature would cause shrinkage of the plastic. If the glass fiber were embedded in the plastic, it would undergo possibly very severe bending with attendant light attenuation and possible breakage. In the present invention, the optical conductors are movable in the plastic buffer tubes so they can take a different position to relieve stress.

Figure 5:
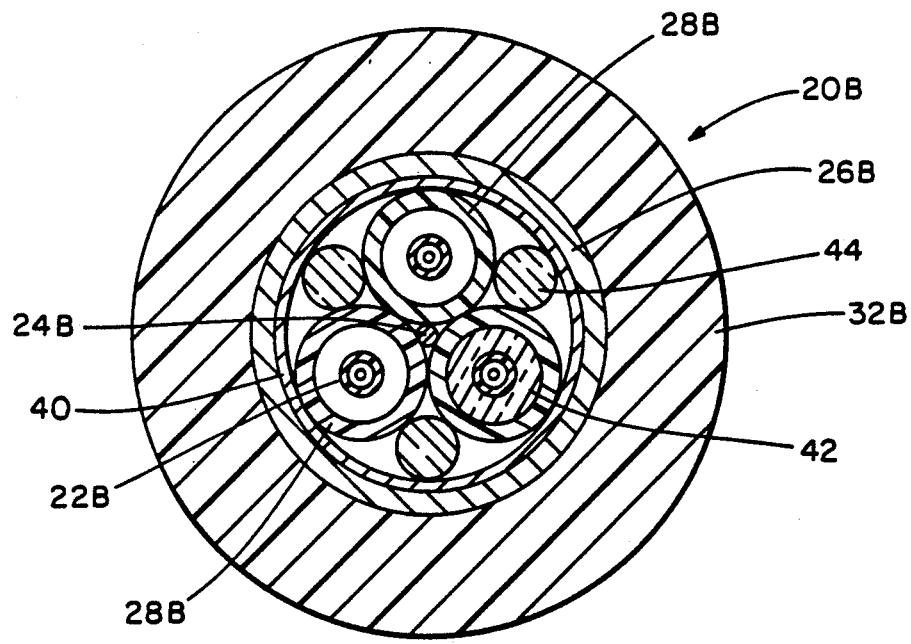
FIG. 5 is a transverse cross-sectional view of another alternate preferred embodiment of the hybrid cable of the present invention.

Another alternative preferred embodiment of the hybrid cable of the present invention is generally indicated at reference character 20B in FIG. 5. Components of the cable 20B generally corresponding to components of the cable 20 are indicated by the reference numeral assigned to the component of cable 20 with the addition of the suffix "B". The cable 20B is similar to the cable 20A in that a plurality of the buffer tubes 28B function to hold centered the metallic conductor 24B. In the cable 20B, the buffer tubes are held in their assembled condition by means of the inner jacket 40 which could be extruded or formed by means of a Mylar tape wrap (Mylar is a registered trademark of Dupont for polyester film). This inner insulative jacket functions to shape the cross-sectional configuration of the braid 26B. As in the previous preferred embodiments of the hybrid cable of the present invention, in the cable 20B air at least partially occupies the interior of each buffer tube 28B which is not occupied by optical conductor 22B, so that the optical conductor is movable within the tube. Optionally, however, the buffer tube can be packed with an insulative gel 42, as shown in one of the buffer tubes 28B in FIG. 5, for providing additional water blockage, or the buffer tube can partially be filled with a strength member such as glass fibers or aramid yarn. Additionally, dielectric strength members 44 can be used to fill spaces between the tubes 28B and the braid or the inner jacket. As shown in FIG. 5, each strength member 44 engages a pair of the buffer tubes.

It will be appreciated that the various preferred embodiments of the hybrid cable of the present invention exhibit relatively low capacitance because air space is left between the central metallic conductor and the braid coaxial therewith. If plastic were used to fill all this space, the capacitance exhibited by the cable would be much greater because the dielectric constant of plastic is much greater than that of air.

Referring to FIG. 6, a method of using the hybrid cable 20 is shown. A fiber optic transmitter 46 is connected to provide an optical signal to conductor 22 and an electronic transmitter 48 is connected to the metallic conductor 24 and the braid 26 for applying an electrical signal. When used for secure transmissions, a confidential signal could be transmitted over the optical conductor while a non-confidential or a decoy signal could be transmitted using the electrical conductors. A party tapping the hybrid cable 20 as a conventional coaxial cable would be led to believe that the non-confidential electrical signal was the only signal carried by the cable. Even if the party attempting interception realized that the confidential signal was transmitted by means of the optical conductor, it would be very difficult to intercept the optical signal without destroying the cable because, as the optical conductor is movable inside the cable, its engagement by a probe would only cause it to deflect.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A hybrid cable of substantially uniform cross section throughout its length for concurrently carrying an electrical signal which does not carry confidential information and an optical signal which does not carry confidential information, said cable comprising:
    a metallic conductor disposed at the center of the cable for carrying said electrical signal,
    a resilient buffer tube,
    an optical conductor for carrying said optical signal disposed inside said tube and having an outside diameter smaller than the inside diameter of said tube, said optical conductor being movable inside said tube,
    a metallic shield surrounding said metallic conductor and said tube,
    centering means for maintaining said metallic conductor and said shield coaxial, and
    an electrically insulative resilient outer jacket whereby said cable gives the appearance of and taps as a conventional coaxial cable, but additionally can transmit an optical signal.

2. A hybrid cable as set forth in claim 1 wherein said shield is a braid.

3. A hybrid cable as set forth in claim 2 further comprising a metallic foil surrounding said tube and said metallic conductor and engaging said braid.

4. A hybrid cable as set forth in claim 3 wherein said foil is disposed inwardly of said braid.

5. A hybrid cable as set forth in claim 1 wherein said metallic conductor is positioned, along with said optical conductor, inside said tube.

6. A hybrid cable as set forth in claim 5 wherein said centering means comprises a length of a dielectric spacer wound around said metallic conductor and concurrently engaging said metallic conductor and the inner surface of said tube.

7. A hybrid cable as set forth in claim 1 comprising a plurality of buffer tubes including the aforementioned resilient buffer tube with each tube engaging said metallic conductor, said centering means comprising said buffer tubes.

8. A hybrid cable as set forth in claim 7 further comprising a plurality of optical conductors corresponding in number to said plurality of tubes with an optical conductor positioned inside each tube.

9. A hybrid cable as set forth in claim 7 wherein there are three buffer tubes and each tube concurrently engages said metallic conductor and the other two tubes.

10. A hybrid cable as set forth in claim 7 further comprising an inner insulative jacket disposed surrounding said tubes and inside said shield for shaping the cross-sectional configuration of said shield.

11. A hybrid cable as set forth in claim 10 wherein said inner jacket is a wrap of dielectric tape.

12. A hybrid cable as set forth in claim 7 further comprising dielectric strength members filling spaces between said tubes and said shield, each strength member engaging a pair of said tubes.

13. A hybrid cable as set forth in claim 1 wherein air at least partially occupies the interior of said tube not occupied by said optical conductor so that the optical conductor is movable within said tube.

14. A hybrid cable as set forth in claim 1 wherein an insulative gel at least partially occupies the interior of said tube not occupied by said optical conductor.

15. A method of using a hybrid cable which has the outward appearance of a conventional coaxial cable and which is adapted to simultaneously carry an electrical signal and an optical signal, said hybrid cable being of substantially uniform cross section throughout its length and comprising:
    a metallic conductor held at the center of said hybrid cable for carrying said electrical signal,
    a resilient buffer tube,
    an optical conductor for carrying said optical signal disposed inside said tube and having an outside diameter smaller than the inside diameter of said tube, said optical conductor being movable inside said tube,
    a metallic shield surrounding said metallic conductor and said tube, and
    an electrically insulative resilient outer jacket, said method comprising the steps of:
    (a) applying an optical signal carrying confidential information to said optical conductor, and
    (b) applying an electrical signal which does not carry confidential information to said metallic conductor whereby tapping of said hybrid cable as a conventional coaxial cable yields only the non-confidential electrical signal.

* * * * *

UNITED STATES PATENT AND TRADEMARK OFFICE
CERTIFICATE OF CORRECTION

PATENT NO. : 4,695,127
DATED : September 22, 1987
INVENTOR(S) : Ronald L. Ohlhaber It is certified that error appears in the above-identified patent and that said Letters Patent is hereby corrected as shown below:

Column 2, line 4, change "cabe" to --cable--.

Column 2, line 17, change "the" (first occurrence) to --than--.

Column 5, line 15, after "does" delete "not".

Signed and Sealed this

Second Day of February, 1988

*Attest:*

DONALD J. QUIGG

*Attesting Officer*       *Commissioner of Patents and Trademarks*